(12) United States Patent
Yamamoto et al.

(10) Patent No.: US 10,914,151 B2
(45) Date of Patent: Feb. 9, 2021

(54) HYDROCARBON RECOVERY METHOD AND HYDROCARBON RECOVERY SYSTEM

(71) Applicant: JAPAN OIL, GAS AND METALS NATIONAL CORPORATION, Tokyo (JP)

(72) Inventors: Koji Yamamoto, Tokyo (JP); Toshiro Hata, Izumi (JP); Yurika Takahashi, Izumi (JP)

(73) Assignee: JAPAN OIL, GAS AND METALS NATIONAL CORPORATION, Tokyo (JP)

(*) Notice: Subject to any disclaimer, the term of this patent is extended or adjusted under 35 U.S.C. 154(b) by 0 days.

(21) Appl. No.: 16/723,252

(22) Filed: Dec. 20, 2019

(65) Prior Publication Data

US 2020/0123885 A1  Apr. 23, 2020

Related U.S. Application Data

(63) Continuation of application No. PCT/JP2018/017827, filed on May 8, 2018.

(30) Foreign Application Priority Data

Jun. 30, 2017 (JP) ................................ 2017-128959

(51) Int. Cl.
*C09K 8/582* (2006.01)
*E21B 43/16* (2006.01)
*C09K 8/58* (2006.01)

(52) U.S. Cl.
CPC .............. *E21B 43/162* (2013.01); *C09K 8/58* (2013.01); *E21B 43/164* (2013.01)

(58) Field of Classification Search
CPC ......... C09K 8/582; C09K 8/58; E21B 43/162; E21B 43/164

(Continued)

(56) References Cited

U.S. PATENT DOCUMENTS 9,739,129 B2 * 8/2017 Cunningham ........ C09K 8/5045
2013/0078690 A1 * 3/2013 Reed ...................... C12P 7/649
435/140

(Continued)

FOREIGN PATENT DOCUMENTS

| JP | 2012-172418 | 9/2012 |
| JP | 2014-231711 | 12/2014 |
| JP | 2016-098598 | 5/2016 |

OTHER PUBLICATIONS

International Search Report, dated Jul. 24, 2018 (Jul. 24, 2018), 2 pages.

(Continued)

*Primary Examiner* — Angela M DiTrani Leff
(74) *Attorney, Agent, or Firm* — Rankin, Hill & Clark LLP

(57) ABSTRACT

A hydrocarbon recovery method for recovering a production fluid containing hydrocarbons from a production well provided in the seabed in which microorganisms that produce carbon dioxide or sulfate ions for promoting a deposition of calcium carbonate exist, the method includes: an injecting process of injecting, into the production well, a composition used for producing carbon dioxide or sulfate ions by the microorganisms; a decompressing process of decompressing an inside of the production well after the composition is injected; and a recovering process of recovering the hydrocarbons in a state in which the inside of the production well is decompressed.

10 Claims, 7 Drawing Sheets

(58) Field of Classification Search
USPC .................................................. 166/269, 246
See application file for complete search history.

(56) References Cited

U.S. PATENT DOCUMENTS

| | | | |
|---|---|---|---|
| 2014/0256055 A1* | 9/2014 | Pottorf ................... | G01N 29/14 436/163 |
| 2016/0017208 A1* | 1/2016 | Coates ..................... | C12N 1/20 507/274 |
| 2019/0002753 A1* | 1/2019 | Wilson ................... | C09K 8/487 |

OTHER PUBLICATIONS

Kaneda et al. "Experimental solidification of viscous soil-type test specimen by urease activity", Presentation and lectures of the 52nd Geotechnical Engineering Research Presentation of the Japan Geotechnical Society, Jun. 20, 2017, pp. 293-294, Listed in International Search Report, partial English translation included, 4 pages.
Written Opinion, 3 pages.
International Preliminary Report on Patentability, English translation included, 11 pages.

* cited by examiner

HYDROCARBON RECOVERY METHOD AND HYDROCARBON RECOVERY SYSTEM

CROSS-REFERENCE TO RELATED APPLICATIONS

The present application is a continuation application of International Application No. PCT/JP2018/017827, filed on May 8, 2018, which claims priority to Japanese Patent Application No. 2017-128959, filed on Jun. 30, 2017. The contents of these applications are incorporated herein by reference in their entirety.

BACKGROUND OF THE INVENTION

The present invention relates to a hydrocarbon recovery method and a hydrocarbon recovery system.

Conventionally, a technique for recovering a composition containing hydrocarbons buried underground has been known. Japanese Unexamined Patent Application Publication No. 2016-98598 discloses a technique for recovering methane hydrate from the seabed.

When a composition containing hydrocarbons is recovered from the seabed, the seabed collapses due to the occurrence of cavities in a region where the recovered composition existed, and there is trouble with sand, in which earth and sand flowed into the hydrocarbon production well. If earth and sand flow into the production well, the production well is blocked, and hydrocarbons cannot be recovered. Therefore, measures to prevent earth and sand from flowing into the production well have been sought.

BRIEF SUMMARY OF THE INVENTION

The present invention focuses on this point, and an object of the invention is to provide a hydrocarbon recovery method and a hydrocarbon recovery system for restricting earth and sand from flowing into a production well when recovering hydrocarbons.

The hydrocarbon recovery method of the first aspect of the present invention is a hydrocarbon recovery method for recovering a production fluid containing hydrocarbons from a production well provided in the seabed in which microorganisms that produce carbon dioxide or sulfate ions for promoting a deposition of calcium carbonate exist. The hydrocarbon recovery method includes: injecting, into the production well, a composition used for producing carbon dioxide or sulfate ions by the microorganisms; decompressing an inside of the production well after the composition is injected; and recovering the hydrocarbons in a state in which the inside of the production well is decompressed.

The hydrocarbon recovery system of the second aspect of the present invention is a hydrocarbon recovery system for recovering a production fluid containing hydrocarbons from a production well provided in a seabed in which microorganisms that produce carbon dioxide or sulfate ions for promoting a deposition of calcium carbonate exist. The hydrocarbon recovery system includes: an injection apparatus that injects, into the production well, a composition used for producing carbon dioxide or sulfate ions by the microorganisms; a pressure regulating apparatus that decompresses an inside of the production well after the composition is injected; and a recovery apparatus that recovers the hydrocarbons in a state in which the inside of the production well is decompressed.

DETAILED DESCRIPTION OF THE INVENTION

Hereinafter, the present invention is described through the exemplary embodiment but the undermentioned embodiment does not limit the invention according to the claims, and all of the combinations of characteristics described in the embodiment are not necessarily essential for a solution of the invention.

[Outline of a Hydrocarbon Recovery Method]

Figure 1:
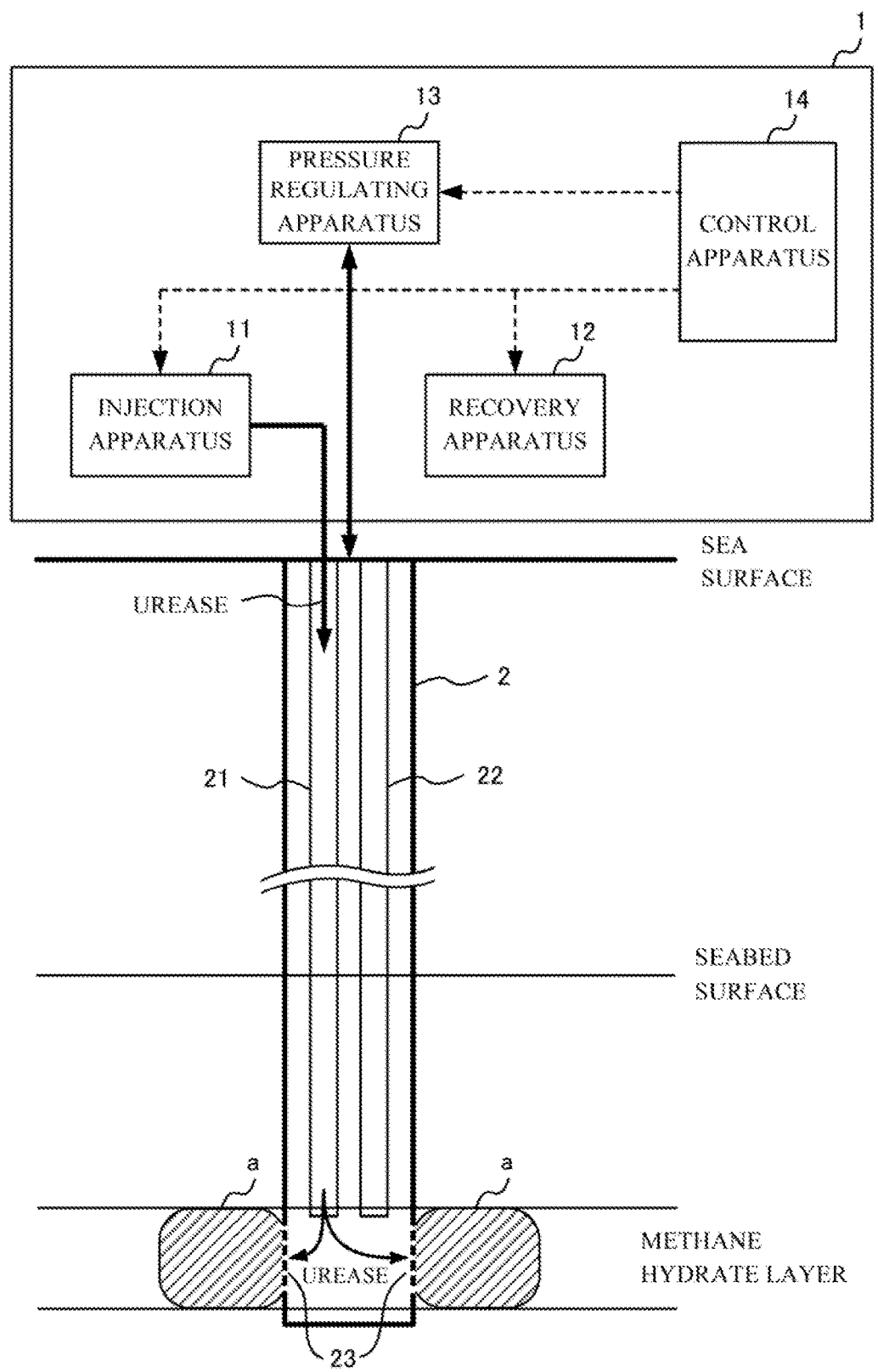
FIG. 1 illustrates an outline of a hydrocarbon recovery method of the first embodiment.
Figure 2:
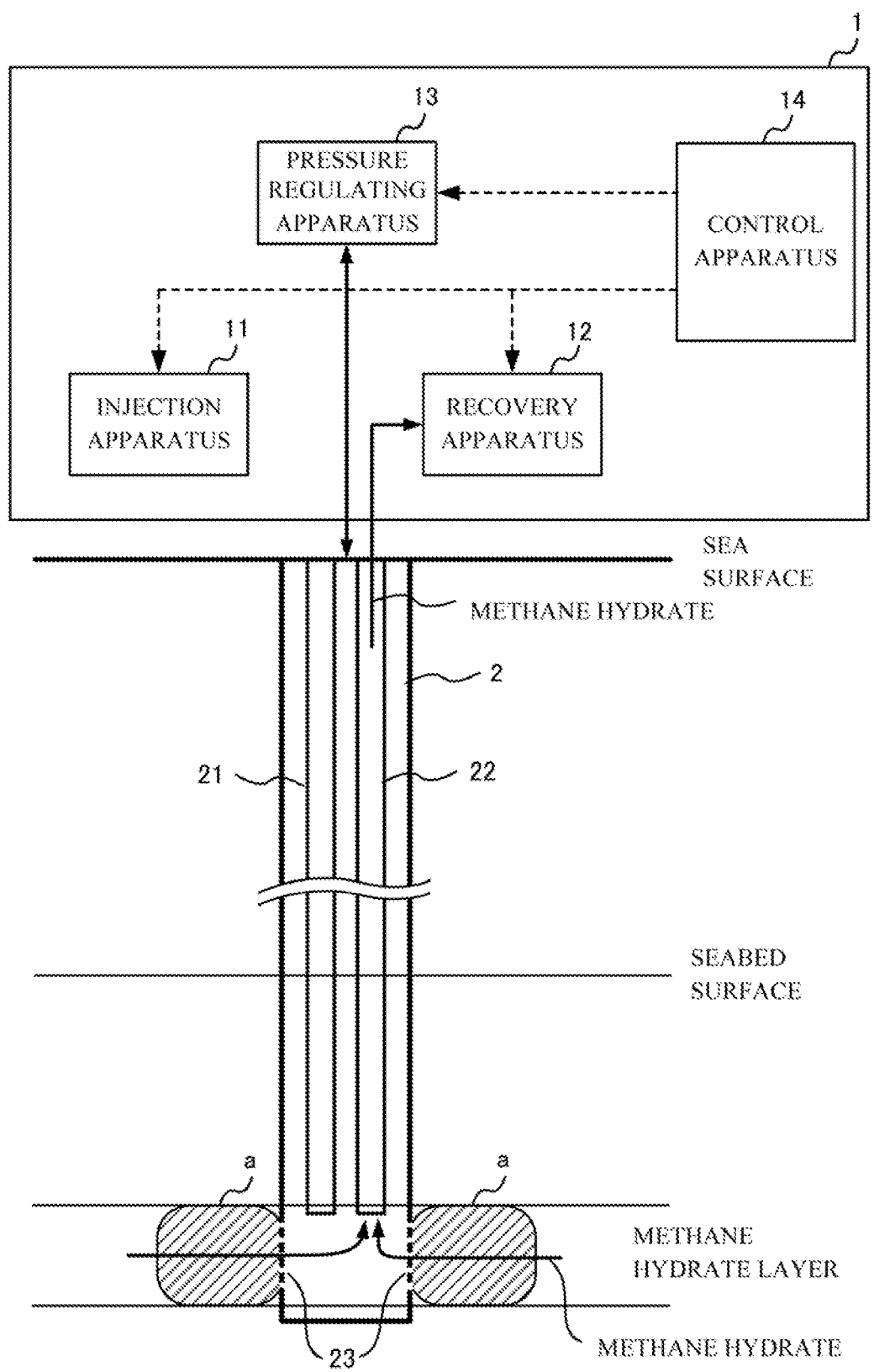
FIG. 2 illustrates the outline of the hydrocarbon recovery method of the first embodiment.

FIGS. 1 and 2 are each a diagram illustrating an outline of a hydrocarbon recovery method of the present embodiment. In FIGS. 1 and 2, a hydrocarbon recovery system 1 and a production well 2 are shown.

As will be described in detail later, the hydrocarbon recovery system 1 is an apparatus for recovering, for example, methane hydrate as hydrocarbons contained in the seabed. The hydrocarbon recovery system 1 is mounted on, for example, a ship for recovering methane hydrate.

The hydrocarbon recovery system 1 includes an injection apparatus 11, a recovery apparatus 12, a pressure regulating apparatus 13, and a control apparatus 14. The control apparatus 14 is a computer that controls the injection apparatus 11, the recovery apparatus 12, and the pressure regulating apparatus 13. The control apparatus 14 executes a process for recovering hydrocarbons by executing programs stored in a storage medium or based on an operator's operation.

The production well 2 is a well for recovering the methane hydrate buried in a methane hydrate layer in the seabed. The production well 2 includes (i) an injection pipe 21 for injecting a composition used to prevent the earth and sand contained in the seabed from flowing into the production well 2, (ii) a recovery pipe 22 for recovering the methane hydrate, and (iii) an opening part 23.

The hydrocarbon recovery method of the present embodiment is characterized in that this method uses, as the composition used to prevent the earth and sand contained in the seabed from flowing into the production well 2, a composition used for producing carbon dioxide or sulfate ions by microorganisms that produce carbon dioxide or sulfate ions for promoting deposition of calcium carbonate. In this way, earth and sand in a region "a" near the opening part 23 in the methane hydrate layer shown in FIGS. 1 and 2 are solidified, therefore it is possible to restrict the earth and sand from flowing into the production well 2 during recovery of methane hydrate.

The First Embodiment

[Configuration of the Hydrocarbon Recovery System 1]

Figure 3:
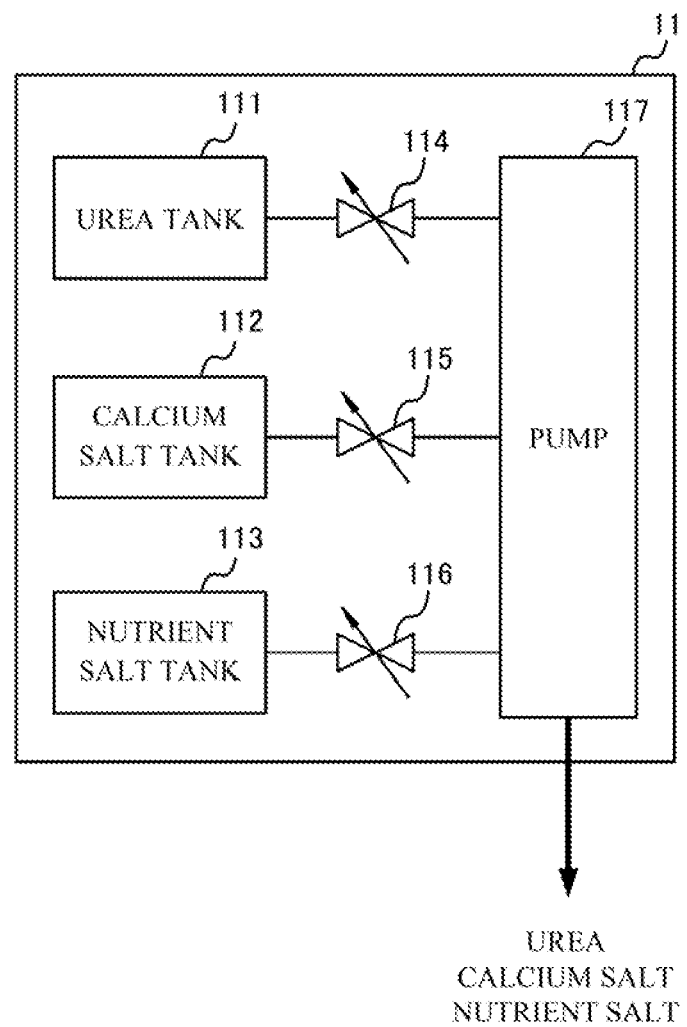
FIG. 3 shows a configuration of an injection apparatus.

FIG. 3 shows a configuration of the injection apparatus 11 according to the first embodiment. Hereinafter, a method of recovering hydrocarbons by the hydrocarbon recovery system 1 will be described with reference to FIGS. 1 to 3.

The injection apparatus 11, as shown in FIG. 1, is an apparatus that, before recovering the methane hydrate, injects a composition, which is necessary for preventing earth and sand from flowing into the production well 2, into the production well 2 through the injection pipe 21. The composition necessary for preventing the earth and sand from flowing into the production well 2 is a composition used for producing carbon dioxide by microorganisms that produce carbon dioxide for promoting the deposition of calcium carbonate.

The microorganisms used in the first embodiment are microorganisms that have urease activity and hydrolyze urea. In this case, the composition to be injected through the injection pipe 21 is urea. Together with the urea, the injection apparatus 11 may further inject a composition containing calcium salt necessary for producing the calcium carbonate. The composition containing the calcium salt is, for example, calcium chloride, calcium acetate, or calcium nitrate. The injection apparatus 11 may further inject nutrient salt which is absorbed by the microorganisms to become nutrients for the microorganisms and activates the microorganisms. The injection of the nutrient salt by the injection apparatus 11 in this manner enables the microorganisms to hydrolyze urea even in the seabed where the nutrients for microorganisms are poor.

As shown in FIG. 3, the injection apparatus 11 includes a urea tank 111, a calcium salt tank 112, a nutrient salt tank 113, a valve 114, a valve 115, a valve 116, and a pump 117. The urea tank 111 is a tank for storing the urea to be injected into the production well 2. The calcium salt tank 112 is a tank for storing the calcium salt to be injected into the production well 2. The nutrient salt tank 113 is a tank for storing the nutrient salt to be injected into the production well 2.

The valve 114 is a valve for adjusting an amount of the urea stored in the urea tank 111 to be injected to the production well 2 based on the control of the control apparatus 14. The valve 115 is a valve for adjusting an amount of the calcium salt stored in the calcium salt tank 112 to be injected to the production well 2 based on the control of the control apparatus 14. The valve 116 is a valve for adjusting an amount of the nutrient salt stored in the nutrient salt tank 113 to be injected to the production well 2 based on the control of the control apparatus 14. The pump 117 is a pump for forcing the urea, calcium salt, and nutrient salt into the production well 2.

The recovery apparatus 12 is an apparatus for recovering methane hydrate from the production well 2, and has a pump (not shown) for sucking the methane hydrate. Based on the control of the control apparatus 14, the recovery apparatus 12 starts the recovery of the methane hydrate after a predetermined time had passed since the injection apparatus 11 injected the urea. The predetermined time is, for example, a time required for the deposition of calcium carbonate due to a reaction between (i) the calcium salt present in the seabed and (ii) the carbon dioxide produced by hydrolysis of urea by the microorganisms having urease activity.

In this way, the recovery apparatus 12 can recover the methane hydrate in a state in which the earth and sand in the region "a" near the production well 2 in the methane hydrate layer are solidified. As a result, the earth and sand in the region "a" near the production well 2 do not flow into the production well 2 during the recovery of the methane hydrate, so that the recovery apparatus 12 can improve the recovery efficiency of the methane hydrate.

The pressure regulating apparatus 13 is an apparatus for regulating pressure inside the production well 2 based on the control of the control apparatus 14. The pressure regulating apparatus 13 decompresses the inside of the production well 2, for example, in order to move microorganisms existing in the seabed toward the side of the production well 2, or decompresses the inside of the production well 2 in order to recover the methane hydrate.

The opening part 23 is a mesh-like area provided at a position near a tip of the injection pipe 21 on a wall surface of the production well 2. The urea injected through the injection pipe 21 is injected from the opening part 23 into the seabed, and the urea is absorbed by the microorganisms in the seabed. It is preferable that the opening part 23 is provided in a part of the seabed around the production well 2 that has high water permeability. In this way, the urea can be preferentially injected into the ground where the probability of the earth and sand flowing into the production well 2 is high, and therefore the ground where the probability of the earth and sand flowing into the production well 2 is high can be solidified efficiently.

[Principles of the Deposition of Calcium Carbonate]

Hereinafter, the principles of the deposition of calcium carbonate by injecting the urea into the production well 2 will be described.

The microorganisms having urease activity hydrolyze urea by a reaction represented by the following Equation (1) to produce carbon dioxide.

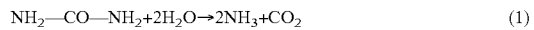

$$NH_2-CO-NH_2 + 2H_2O \rightarrow 2NH_3 + CO_2 \quad (1)$$

When the carbon dioxide is produced, carbonate ions are produced by a reaction represented by the following Equation (2).

$$CO_2 + H_2O \rightarrow CO_3^{2-} + 2H^+ \quad (2)$$

When the carbonate ion is produced, the calcium salt contained in the seabed or the calcium salt injected by the injection apparatus 11 reacts with the carbonate ion as represented by Equation (3), and the calcium carbonate is deposited. Because the earth and sand in the region "a" are solidified by the deposition of the calcium carbonate in the seabed, it is possible to prevent the earth and sand in the seabed from flowing into the production well 2.

$$Ca^{2+} + CO_3^{2-} \rightarrow CaCO_3 \quad (3)$$

[Method for Promoting Solidification of the Seabed]

In the hydrocarbon recovery method, the following steps may be executed in order to promote solidification of the seabed.

(1) Injecting Nutrient Salt

The hydrocarbon recovery method may further include a step of injecting the nutrient salt serving as the nutrients for the microorganisms to activate the hydrolysis of urea by the microorganisms. The nutrient salt is, for example, yeast extract. By injecting the nutrient salt suitable for microorganisms having a high ability to hydrolyze urea, it is possible to realize a prioritization for preferentially activating the microorganisms having a high ability to hydrolyze urea. Prioritizing microorganisms that are highly capable of hydrolyzing urea increases the amount of the carbon dioxide produced by the microorganisms, and therefore the deposition amount of the calcium carbonate increases.

The hydrocarbon recovery method may further include a step of injecting the calcium salt in an amount corresponding to the amount of the nutrient salt to be injected. For example, the amount of the calcium salt corresponding to the amount of the nutrient salt to be injected is an amount corresponding to an increased amount of the carbon dioxide produced by the microorganisms activated by the nutrient salt. In this way, it is possible to deposit the calcium carbonate while making maximum use of the carbon dioxide increased by the injection of the nutrient salt.

(2) Injecting Microorganisms

The hydrocarbon recovery method may further include a microorganism injecting step of injecting the microorganisms having urease activity to increase the amount of the carbon dioxide used for the deposition of the calcium carbonate. In order to inject the microorganisms capable of hydrolyzing the urea in the seabed, the hydrocarbon recovery method may further include a step of culturing the microorganisms to be injected into the production well 2 in an anaerobic environment where water recovered from the production well 2 exists, which is executed prior to the microorganism injecting step. In the step of culturing the microorganisms, microorganisms having the same genetic information as that of the microorganisms having high activity in the seabed are preferentially cultured. By injecting the microorganisms cultured in this manner into the production well 2, the amount of carbon dioxide produced by the prioritized microorganisms increases, and the deposition amount of the calcium carbonate increases.

It should be noted that the hydrocarbon recovery method may further include a step of injecting the calcium salt in an amount corresponding to the amount of microorganisms to be injected. For example, the amount of the calcium salt corresponding to the amount of the microorganisms to be injected is an amount corresponding to an increased amount of the carbon dioxide produced by the increased microorganisms in the region "a" near the production well 2. In this way, it is possible to deposit the calcium carbonate while making maximum use of the carbon dioxide increased by the injection of the microorganisms.

[Process of the Hydrocarbon Recovery Method]

Figure 4:
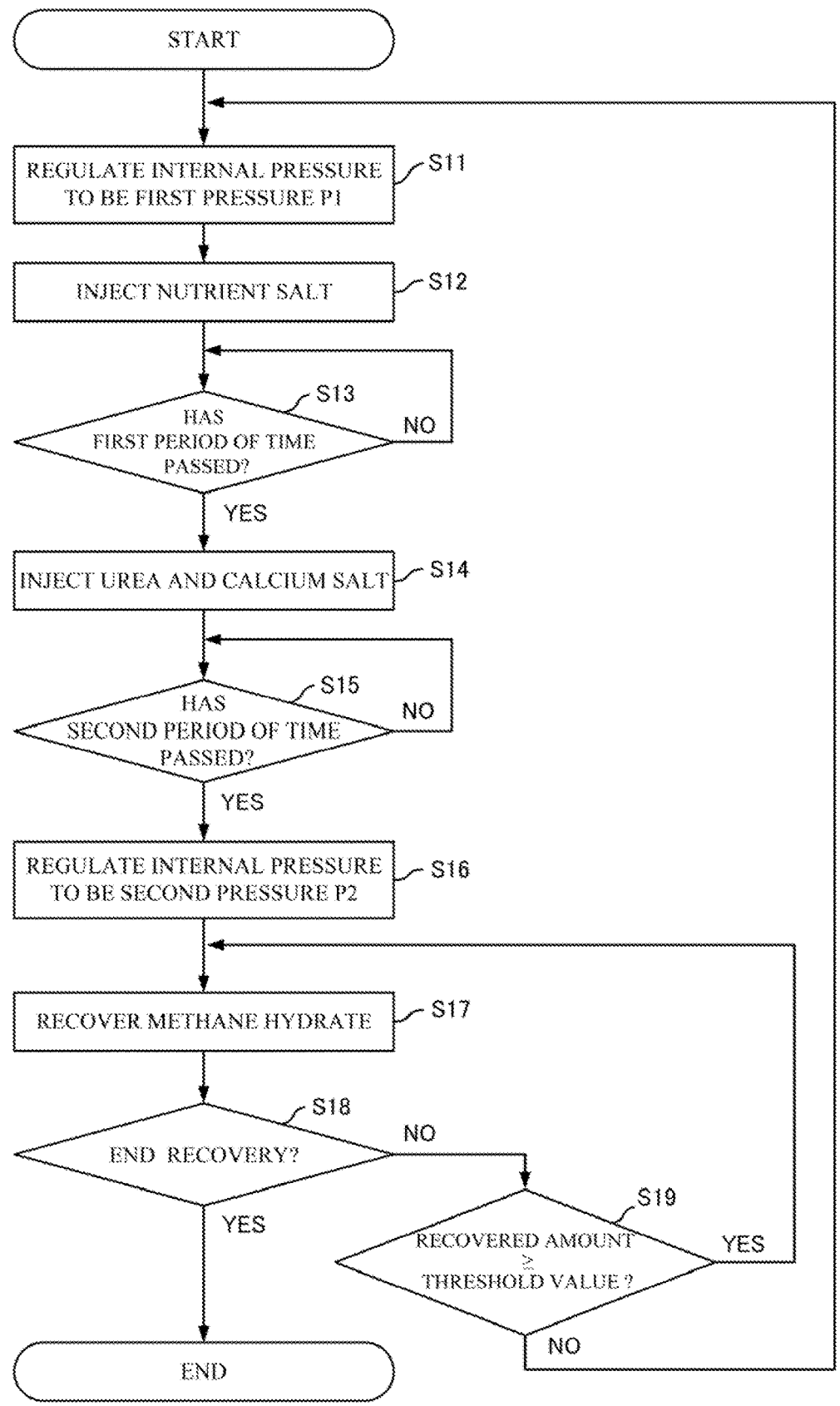
FIG. 4 is a flowchart showing a process of the hydrocarbon recovery method.

FIG. 4 is a flowchart showing a process of the hydrocarbon recovery method. First, by controlling the pressure regulating apparatus 13, the control apparatus 14 regulates the internal pressure of the production well 2 to be the first pressure P1 in order to move the microorganisms in the seabed toward the side of the production well 2 (step S11). For example, the control apparatus 14 regulates the internal pressure of the production well 2 to be the first pressure P1, which is lower than the pressure in the seabed. Lowering the internal pressure of the production well 2 to the first pressure P1, which is lower than the pressure in the seabed, in this manner makes it easy for the microorganisms existing in the seabed to move to the region "a" near the production well 2, and therefore the amount of microorganisms existing in the region "a" near the production well 2 increases. As the amount of microorganisms existing in the region "a" near the production well 2 increases, the deposition amount of calcium carbonate in the region "a" increases. Therefore, the hydrocarbon recovery system 1 can more effectively prevent the earth and sand from flowing into the production well 2 by lowering the internal pressure of the production well 2 to the first pressure P1, which is lower than the pressure in the seabed.

Next, by controlling the injection apparatus 11, the control apparatus 14 injects the nutrient salt for activating the microorganisms into the production well 2 (step S12). Thereafter, the control apparatus 14 waits until the first period of time required for the microorganisms to absorb and activate the nutrient salt passes (step S13).

When the first period of time has passed (YES in step S13), the control apparatus 14 injects the urea and calcium salt into the production well 2 by controlling the injection apparatus 11 (step S14). When the urea and the calcium salt are injected by the injection apparatus 11, the microorganisms hydrolyze the urea to produce the carbon dioxide, and the calcium carbonate is deposited due to a reaction between (i) the injected calcium salt and (ii) the carbonate ion based on the carbon dioxide. The control apparatus 14 waits until the second period of time required for depositing the calcium carbonate that corresponds to the amount of urea injected by the injection apparatus 11 passes (step S15).

When the second period of time has passed (YES in step S15), the control apparatus 14 regulates the internal pressure of the production well 2 to be the second pressure P2 by controlling the pressure regulating apparatus 13 (step S16). The second pressure P2 is, for example, a pressure lower than the first pressure P1. If the second pressure P2 is sufficiently low, the methane hydrate present in the high-pressure environment in the seabed moves toward the side of the production well 2. The control apparatus 14 causes the recovery apparatus 12 to recover the methane hydrate that has moved toward the side of the production well 2 (step S17).

After lowering the internal pressure of the production well 2 to the second pressure P2 and starting the recovery of the methane hydrate, the control apparatus 14 determines whether or not to end the recovery of the methane hydrate (step S18). When the operator performs an operation to end the recovery of the methane hydrate (YES in step S18), the control apparatus 14 ends the recovery of the methane hydrate.

When it is determined that that the operation for completing the recovery of the methane hydrate has not been performed (NO in step S18), the control apparatus 14 determines whether or not the amount of the methane hydrate to be recovered within a unit time is equal to or larger than a threshold value (step S19). If the amount of the methane hydrate to be recovered within the unit time is equal to or larger than the threshold value (YES in step S19), the control apparatus 14 returns to step S17 and continues the recovery of the methane hydrate.

On the other hand, if the amount of the methane hydrate to be recovered within the unit time is less than the threshold value (NO in step S19), the control apparatus 14 returns processing to step S11 and repeats processing from step S11 to step S17. The control apparatus 14 further recovers the methane hydrate after the nutrient salt, urea, and calcium salt are injected into the production well 2. In this way, it is possible to promote the solidification of the seabed at the time when a cavity occurs in the seabed due to the methane hydrate being recovered from the seabed. As a result, the hydrocarbon recovery system 1 can prevent the earth and sand from flowing into the production well 2 even after the recovery of the methane hydrate has progressed.

It should be noted that when the amount of methane hydrate to be recovered within the unit time is less than the threshold value in step S19, the control apparatus 14 may return to step S14 instead of step S11 and inject the urea.

In the above-mentioned hydrocarbon recovery method, it is preferable to inject the urea in a state in which the inside of the production well 2 has been made alkaline. By doing this, the microorganisms dissolve to develop viscosity, and the viscosity around the region where the microorganisms exist increases, which is a suitable countermeasure for the sand trouble.

[Verification Experiment 1]

Figure 5:
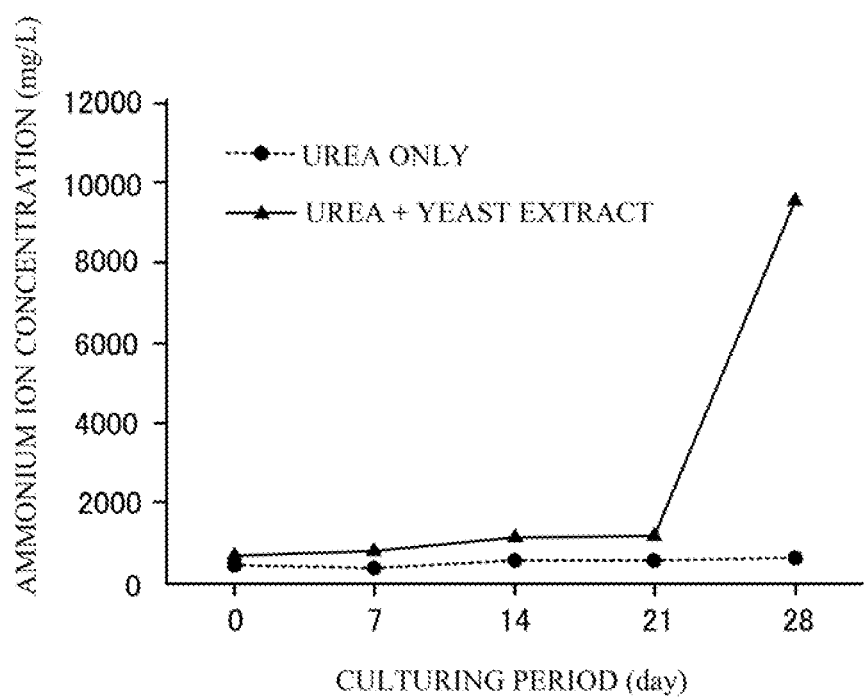
FIG. 5 shows results of a first experiment.

FIG. 5 shows results of a first experiment to confirm the effect of using yeast extract as the nutrient salt. In FIG. 5, the horizontal axis represents the period of time during which microorganisms having urease activity were cultured, and the vertical axis represents an ammonium ion concentration produced by the microorganisms. The broken line of FIG. 5 shows how the ammonium ion concentration changes when only urea is fed to the microorganisms, and the solid line of FIG. 5 shows how the ammonium ion concentration changes when yeast extract is fed to the microorganisms together with urea. When the yeast extract is fed with the urea, the ammonium ion concentration increases rapidly between day 21 and day 28. It is considered that the period until the ammonium ions are produced is shortened because the microorganisms are activated by absorbing the yeast extract.

Figure 6:
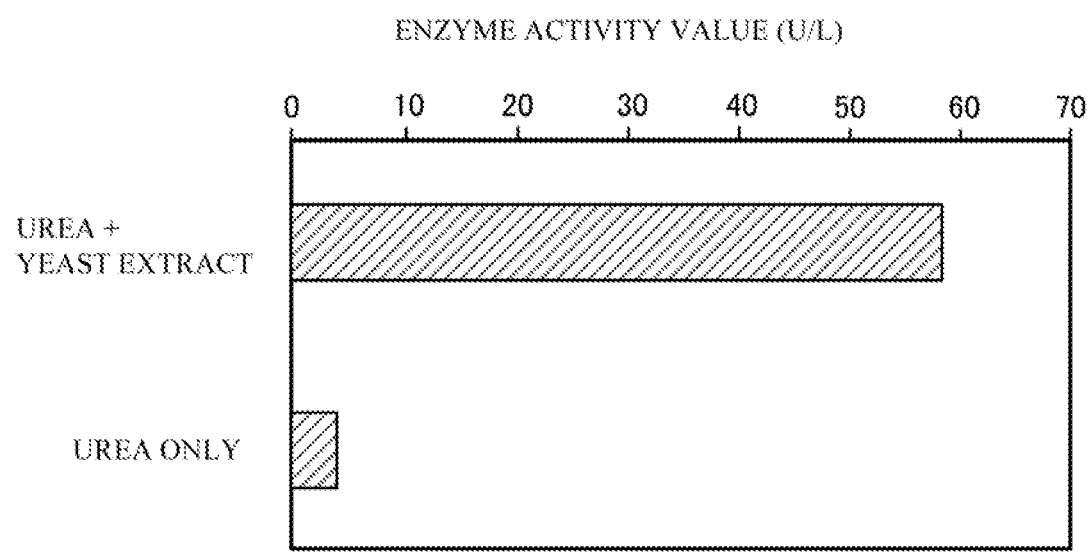
FIG. 6 shows results of a second experiment.

FIG. 6 shows results of a second experiment to confirm the effect of using yeast extract as the nutrient salt. FIG. 6 shows a degree of urease activity per liter of culture medium containing microorganisms. It was confirmed that urease activity was greatly increased by feeding yeast extract together with urea.

Figure 7:
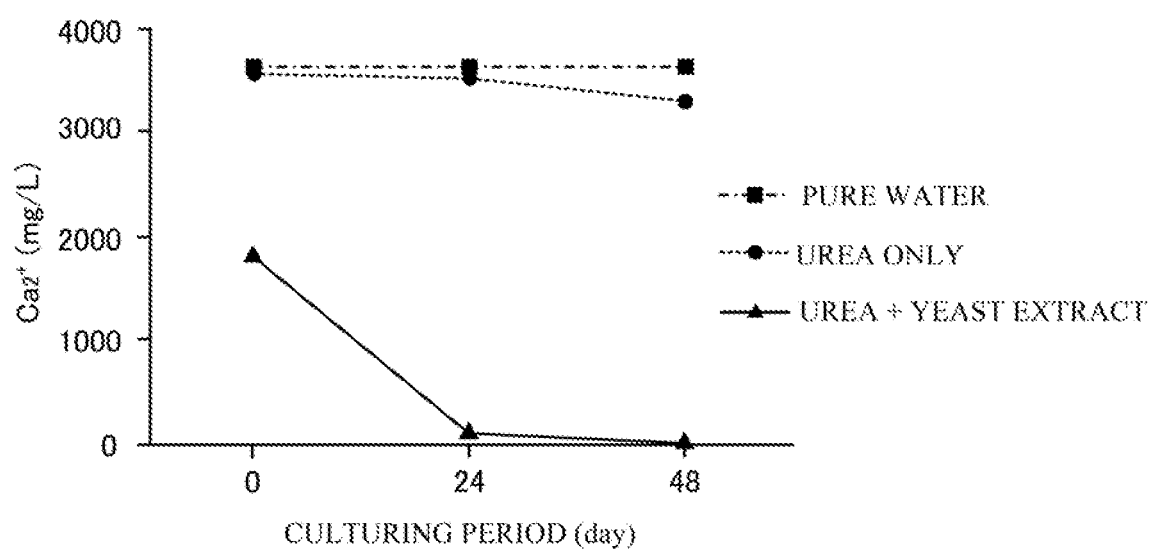
FIG. 7 shows results of a third experiment.

FIG. 7 shows results of a third experiment to confirm the effect of using yeast extract as the nutrient salt. In FIG. 7, the horizontal axis represents the cultivation time of the microorganisms, and the vertical axis represents a concentration of calcium ions in a culture medium of the microorganisms. The one-dot chain line of FIG. 7 shows a case where pure water is used as the culture medium. The broken line of FIG. 7 shows a case where only urea is added to the culture medium. The solid line of FIG. 7 shows a case where urea and yeast extract are added to the culture medium.

According to FIG. 7, it can be seen that the calcium ion concentration rapidly decreases within 24 hours when the urea and yeast extract are added to the culture medium. Because the calcium ion concentration decreased, it can be presumed that calcium carbonate was deposited. Thus, it was confirmed that the deposition amount of calcium carbonate was increased by feeding the urea and yeast extract to the microorganisms.

[Effect of the Hydrocarbon Recovery Method According to the First Embodiment]

As described above, in the hydrocarbon recovery method according to the first embodiment, the urea is injected into the production well 2 as the composition used for producing carbon dioxide by the microorganisms that produce the carbon dioxide for promoting the deposition of the calcium carbonate. After the urea is injected, the methane hydrate is recovered in the state in which pressure inside the production well 2 is lowered. By injecting the urea into the production well 2 in this manner, the calcium carbonate is deposited based on the carbon dioxide produced by the microorganisms having urease activity. As a result, the ground near the production well 2 is solidified, and this restricts the earth and sand from flowing into the production well 2.

The Second Embodiment

[Outline of a Hydrocarbon Recovery Method of the Second Embodiment]

In the hydrocarbon recovery method of the first embodiment, urea is injected as the composition used for producing the carbon dioxide by the microorganisms. On the other hand, a hydrocarbon recovery method of the second embodiment includes a step of injecting thiosulfate as a composition used for producing sulfate ions by the microorganisms, and on this point the hydrocarbon recovery method of the second embodiment differs from that of the first embodiment. The thiosulfate is, for example, sodium thiosulfate or magnesium thiosulfate.

The microorganisms that produce the sulfate ions in the hydrocarbon recovery method of the second embodiment are, for example, sulfur oxidizing bacteria (e.g., *Comamonas thiooxydans*) that hydrolyze sulfur compounds oxidized by thio sulfate. The microorganisms hydrolyze the sulfur compounds oxidized by thiosulfate according to the reaction equation represented by Equation (4) to produce sulfate ions.

$$S_2O_3^{2-}+2O_2+H_2O \rightarrow 2SO_4^{2-}+2H^+ \tag{4}$$

The sulfate ions produced by the microorganisms react with methane contained in the methane hydrate present in the seabed to produce carbonate ions by the reaction equation represented by Equation (5).

$$CH_4+SO_4^{2-} \rightarrow HCO_3^-+HS^- \pm H_2O \tag{5}$$

When the carbonate ions are produced, the calcium salt contained in the seabed or the calcium salt injected by the injection apparatus 11 reacts with the carbonate ions as represented by Equation (3) shown in the description of the first embodiment, and the calcium carbonate is deposited. As a result, similarly to the hydrocarbon recovery method of the first embodiment, it is possible to prevent the earth and sand in the seabed from flowing into the production well 2 by the deposition of the calcium carbonate in the seabed.

In the hydrocarbon recovery method of the second embodiment, it is also possible to execute the step of promoting the solidification of the seabed of the hydrocarbon recovery method of the first embodiment. Specifically, the hydrocarbon recovery method may further include a step of injecting the nutrient salt serving as the nutrients for the microorganisms to promote the hydrolysis of thiosulfate by the microorganisms. Prioritizing microorganisms having a high ability to hydrolyze thiosulfates increases the amount of the sulfate ions produced by the microorganisms, and therefore the amount of the carbonate ions increases, thereby causing the amount of sulfate ions to increase, and thus the deposition amount of calcium carbonate increases.

It should be noted that the hydrocarbon recovery method of the second embodiment may further include the step of injecting the calcium salt in an amount corresponding to the amount of the nutrient salt to be injected. In this way, it is possible to deposit the calcium carbonate while making maximum use of the carbonate ions increased by the injection of the nutrient salt.

Also, the hydrocarbon recovery method of the second embodiment may further include a microorganism injecting step of injecting microorganisms capable of hydrolyzing thiosulfate to produce sulfate ions to increase the amount of the carbon dioxide used for the deposition of the calcium carbonate. In order to inject the microorganisms capable of hydrolyzing thiosulfate into the seabed, the hydrocarbon recovery method of the second embodiment may further include a step of culturing the microorganisms to be injected into the production well 2 in the anaerobic environment where water recovered from the production well 2 exists, which is executed prior to the microorganism injecting step. By injecting the microorganisms cultured in this manner into the production well 2, the amount of sulfate ions produced by the microorganisms increases, and the deposition amount of the calcium carbonate increases.

It should be noted that, in the above-mentioned hydrocarbon recovery method, it is preferable to inject the thiosulfate in the state in which the inside of the production well 2 has been made alkaline. By doing this, the microorganisms dissolve to develop viscosity, and the viscosity around the region where the microorganisms exist increases, which is a suitable countermeasure for the sand trouble.

[Effect of the Hydrocarbon Recovery Method of the Second Embodiment]

As described above, in the hydrocarbon recovery method of the second embodiment, the thiosulfate is injected into the production well 2 as the composition used for producing sulfate ions by the microorganisms that produce the sulfate ions for promoting the deposition of the calcium carbonate. After the thiosulfate is injected, the methane hydrate is recovered in the state in which pressure inside the production well 2 is lowered. By injecting the thiosulfate into the production well 2 in this manner, the calcium carbonate is deposited based on the sulfate ions produced by hydrolysis of the thiosulfate by the microorganisms. As a result, the ground near the production well 2 is solidified, and this restricts the earth and sand from flowing into the production well 2.

The Third Embodiment

The hydrocarbon recovery method of the first embodiment uses the microorganisms that have urease activity and hydrolyze the urea, and the hydrocarbon recovery method of the second embodiment uses the microorganisms that hydrolyze the sulfur compounds after the thiosulfate has oxidized the sulfur compounds, but a hydrocarbon recovery method of the third embodiment differs from the hydrocarbon recovery methods of the first embodiment and the second embodiment in that these plural microorganisms are used in combination.

While the recovery of the methane hydrate is not proceeding and the seabed is in the initial state, it is considered that the microorganisms that hydrolyze the sulfur compounds oxidized by the thiosulfate which lives in the seabed can be utilized effectively. On the other hand, at a stage where the recovery of the methane hydrate is advanced and pressure loss and sand trouble are a concern, it is considered that injecting the urea to promote the solidification by the microorganisms having urease activity is effective.

Therefore, in the hydrocarbon recovery method of the third embodiment, the recovery of the methane hydrate starts after the earth and sand are solidified by the microorganisms that hydrolyze the sulfur compounds oxidized by the thiosulfate, and the earth and sand are solidified by the microorganisms that have urease activity and hydrolyze the urea after the recovery of the methane hydrate is advanced. By prioritizing the optimum microorganisms in accordance with the conditions around the production well 2 in this manner, it is possible to recover the methane hydrate while the earth and sand are efficiently solidified.

Further, types and amounts of compositions to be injected may be determined based on types and amounts of microorganisms existing in the seabed near the production well 2 by investigating in advance the types and amounts of the microorganisms existing therein. For example, the urea is preferentially injected when the microorganisms having urease activity exist, and the thiosulfate is preferentially injected when the sulfur oxidizing bacteria exist, thereby causing the microorganisms existing in the seabed to be activated effectively. In addition, necessary microorganisms may be cultured on the basis of results of a preliminary investigation, and the cultured microorganisms may be injected. In this way, it is possible to optimize the conditions of the microorganisms in the seabed.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A hydrocarbon recovery method for recovering a production fluid containing hydrocarbons from a production well provided in a seabed in which microorganisms that produce carbon dioxide for promoting a deposition of calcium carbonate exist, the method comprising:
    injecting, into the production well, a nutrient salt for activating the microorganisms, wherein the nutrient salt comprises yeast extract;
    waiting until a first period of time passes after the nutrient salt is injected into the production well, the first period of time being required for the microorganisms existing in the seabed to absorb the nutrient salt to reach a state of having urease activity:
    injecting urea and calcium salt into the production well after the first period of time has passed;
    waiting until a second period of time passes after the urea and the calcium salt are injected into the production well, the second period of time being required for depositing calcium carbonate that corresponds to an amount of the injected urea;
    decompressing an inside of the production well after the second period of time has passed, thereby lowering an internal pressure of the production well; and
    recovering the hydrocarbons after lowering internal pressure of the production well.

2. The hydrocarbon recovery method according to claim 1, wherein injecting the nutrient salt includes injecting the nutrient salt into the seabed through an opening in the production well.

3. The hydrocarbon recovery method according to claim 1, further comprising:
    before injecting the nutrient salt, lowering internal pressure of the production well to lower than the pressure in the seabed so as to move the microorganisms existing in the seabed to a region near the production well.

4. The hydrocarbon recovery method according to claim 1, wherein the decompressing is performed after the second period of time, wherein calcium carbonate is deposited due to a reaction between (i) calcium salt present in the seabed and (ii) carbon dioxide produced by hydrolysis of urea by the microorganisms having urease activity.

5. The hydrocarbon recovery method according to claim 1, further comprising:
    injecting microorganisms that produce carbon dioxide into the production well.

6. The hydrocarbon recovery method according to claim 5, further comprising:
    before injecting the microorganisms that produce carbon dioxide into the production well, culturing, in an anaerobic environment where water recovered from the production well exists, the microorganisms.

7. The hydrocarbon recovery method according to claim 1, further comprising repeating injection of the nutrient salt after the decompressing.

8. The hydrocarbon recovery method according to claim 7, wherein repeating injection of the nutrient salt is performed when an amount of the hydrocarbons recovered within a unit time in the recovering is less than a threshold value.

9. The hydrocarbon recovery method according to claim 1, wherein injecting the nutrient salt includes injecting the nutrient salt in a state in which inside of the production well has been made alkaline.

10. A hydrocarbon recovery system for recovering a production fluid containing hydrocarbons from a production well provided in a seabed in which microorganisms that produce carbon dioxide or promoting a deposition of calcium carbonate exist, the system comprising:
   an injection apparatus that injects, into the production well, a nutrient salt for activating the microorganisms, wherein the nutrient salt comprises yeast extract;
   a pressure regulating apparatus that decompresses an inside of the production well thereby lowering an internal pressure of the production well;
   a recovery apparatus that recovers the hydrocarbons after lowering internal pressure of the production well; and
   a control apparatus that controls the injection apparatus, the pressure regulating apparatus and the recovery apparatus, wherein
   the control apparatus:
   causes the injection apparatus to inject the nutrient salt into the production well and then causes the injection apparatus to inject urea and calcium salt into the production well after a first period of time has passed, the first period of time being required for the microorganisms existing in the seabed to absorb the nutrient salt to reach a state of having urease activity, and
   causes, after the urea and the calcium salt are injected into the production well by the injection apparatus, the pressure regulating apparatus to decompress the inside of the production well after a second period of time has passed, the second period of time being required for depositing calcium carbonate that corresponds to an amount of the injected urea.

* * * * *